(12) United States Patent
Arbuckle et al.

(10) Patent No.: US 10,845,811 B1
(45) Date of Patent: Nov. 24, 2020

(54) STATION KEEPING METHODS

(71) Applicant: Brunswick Corporation, Lake Forest, IL (US)

(72) Inventors: Jason S. Arbuckle, Horicon, WI (US); Thomas S. Kirchhoff, Fond Du Lac, WI (US); Steven J. Andrasko, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 276 days.

(21) Appl. No.: 15/425,184

(22) Filed: Feb. 6, 2017

Related U.S. Application Data

(60) Provisional application No. 62/301,887, filed on Mar. 1, 2016.

(51) Int. Cl.
    *G05D 1/02* (2020.01)
    *B63H 25/42* (2006.01)
    (Continued)

(52) U.S. Cl.
    CPC ........... *G05D 1/0206* (2013.01); *B62D 6/005* (2013.01); *B63H 25/02* (2013.01); *B63H 25/42* (2013.01);
    (Continued)

(58) Field of Classification Search
    CPC .................................................. G05D 1/0206
    See application file for complete search history.

(56) References Cited

U.S. PATENT DOCUMENTS 2,360,361 A   10/1944   Louis
3,145,683 A    8/1964   Kolb et al.
(Continued)

FOREIGN PATENT DOCUMENTS

EP   816962 A1    7/1998
EP   2161542 A1   3/2010
(Continued)

OTHER PUBLICATIONS

Arbuckle et al., "Station Keeping Methods," Unpublished U.S. Appl. No. 15/445,031, filed Feb. 28, 2017.
(Continued)

*Primary Examiner* — Imran K Mustafa
(74) *Attorney, Agent, or Firm* — Andrus Intellectual Property Law, LLP

(57) ABSTRACT

A method for maintaining a marine vessel propelled by a marine propulsion device in a selected position includes determining a current global position of the marine vessel and receiving a signal command to maintain the current global position. The current global position is stored as a target global position in response to receiving the signal command. A subsequent global position of the marine vessel is determined and a position error difference between the subsequent global position and the target global position is determined. The method includes determining marine vessel movements required to minimize the position error difference, and causing the marine propulsion device to produce a thrust having a magnitude, a direction, and an angle calculated to result in achievement of the required marine vessel movements. At least one of timing and frequency of discontinuity of thrust production is controlled while the position error difference is minimized.

16 Claims, 4 Drawing Sheets

(51) Int. Cl.
 *B62D 6/00* (2006.01)
 *B63H 25/02* (2006.01)
 *B63H 21/21* (2006.01)
(52) U.S. Cl.
 CPC .. *B63H 2021/216* (2013.01); *B63H 2025/022* (2013.01)

(56) References Cited

U.S. PATENT DOCUMENTS

| | | |
|---|---|---|
| 3,177,348 A | 4/1965 | Daniloff |
| 3,187,704 A | 6/1965 | Shatto, Jr. et al. |
| 3,688,252 A | 8/1972 | Thompson |
| 3,715,571 A | 2/1973 | Braddon |
| 3,771,483 A | 11/1973 | Spencer |
| 4,253,149 A | 2/1981 | Cunningham et al. |
| 4,257,718 A | 3/1981 | Rosa et al. |
| 4,428,052 A | 1/1984 | Robinson et al. |
| 4,513,378 A | 4/1985 | Antkowiak |
| 4,769,773 A | 9/1988 | Shatto, Jr. |
| 4,939,661 A | 7/1990 | Barker et al. |
| 4,975,709 A | 12/1990 | Koike |
| 5,172,324 A | 12/1992 | Knight |
| 5,202,835 A | 4/1993 | Knight |
| 5,331,558 A | 7/1994 | Hossfield et al. |
| 5,362,263 A | 11/1994 | Petty |
| 5,386,368 A | 1/1995 | Knight |
| 5,390,125 A | 2/1995 | Sennott et al. |
| 5,491,636 A | 2/1996 | Robertson et al. |
| 5,736,962 A | 4/1998 | Tendler |
| 5,884,213 A | 3/1999 | Carlson |
| 6,059,226 A | 5/2000 | Cotton et al. |
| 6,092,007 A | 7/2000 | Cotton et al. |
| 6,230,642 B1 | 5/2001 | McKenney et al. |
| 6,234,853 B1 | 5/2001 | Lanyi et al. |
| 6,273,771 B1 | 8/2001 | Buckley et al. |
| 6,308,651 B2 | 10/2001 | McKenney et al. |
| 6,377,889 B1 | 4/2002 | Soest |
| 6,446,003 B1 | 9/2002 | Green et al. |
| 6,485,341 B1 | 11/2002 | Lanyi et al. |
| 6,604,479 B2 | 8/2003 | McKenney et al. |
| 6,611,737 B1 | 8/2003 | El-Tahan et al. |
| 6,678,589 B2 | 1/2004 | Robertson et al. |
| 6,848,382 B1 | 2/2005 | Bekker |
| 6,995,527 B2 | 2/2006 | DePasqua et al. |
| 7,140,315 B2 | 11/2006 | Okuyama |
| 7,267,068 B2 | 9/2007 | Bradley et al. |
| 7,268,703 B1 | 9/2007 | Kabel et al. |
| 7,305,928 B2 | 12/2007 | Bradley et al. |
| 7,366,593 B2 | 4/2008 | Fujimoto et al. |
| 7,398,742 B1 | 7/2008 | Gonring |
| 7,416,458 B2 | 8/2008 | Suemori et al. |
| 7,467,595 B1 | 12/2008 | Lanyi et al. |
| 7,476,134 B1 | 1/2009 | Fell et al. |
| 7,538,511 B2 | 5/2009 | Samek |
| 7,561,886 B1 | 7/2009 | Gonring et al. |
| 7,577,526 B2 | 8/2009 | Kim et al. |
| 7,630,798 B2 | 12/2009 | Mossman et al. |
| 7,727,036 B1 | 6/2010 | Poorman et al. |
| 8,050,630 B1 | 11/2011 | Arbuckle |
| 8,082,100 B2 | 12/2011 | Grace et al. |
| 8,145,370 B2 | 3/2012 | Borrett |
| 8,145,371 B2 | 3/2012 | Rae et al. |
| 8,150,621 B1 | 4/2012 | Phillips et al. |
| 8,155,811 B2 | 4/2012 | Noffsinger et al. |
| 8,215,252 B1 | 7/2012 | Chun |
| 8,265,812 B2 | 9/2012 | Pease |
| 8,326,472 B2 | 12/2012 | Igarashi et al. |
| 8,417,399 B2 | 4/2013 | Arbuckle et al. |
| 8,478,464 B2 | 7/2013 | Arbuckle et al. |
| 8,480,445 B2 | 7/2013 | Morvillo |
| 8,510,028 B2 | 8/2013 | Grace et al. |
| 8,515,660 B2 | 8/2013 | Grace et al. |
| 8,515,661 B2 | 8/2013 | Grace et al. |
| 8,527,192 B2 | 9/2013 | Grace et al. |
| 8,543,324 B2 | 9/2013 | Grace et al. |
| 8,645,012 B2 | 2/2014 | Salmon et al. |
| 8,694,248 B1 | 4/2014 | Arbuckle et al. |
| 8,761,976 B2 | 6/2014 | Salmon et al. |
| 8,777,681 B1 | 7/2014 | McNalley et al. |
| 8,807,059 B1 | 8/2014 | Samples et al. |
| 8,808,041 B2 | 8/2014 | Hine et al. |
| 8,831,868 B2 | 9/2014 | Grace et al. |
| 8,924,054 B1 | 12/2014 | Arbuckle et al. |
| 9,039,468 B1 | 5/2015 | Arbuckle et al. |
| 9,110,467 B2 | 8/2015 | Yuet et al. |
| 9,132,900 B2 | 9/2015 | Salmon et al. |
| 9,132,903 B1 | 9/2015 | Gable et al. |
| 9,162,743 B2 | 10/2015 | Grace et al. |
| 9,248,898 B1 | 2/2016 | Kirchhoff et al. |
| 9,359,057 B1 | 6/2016 | Andrasko et al. |
| 9,377,780 B1 | 6/2016 | Arbuckle et al. |
| 9,676,464 B2 | 6/2017 | Johnson et al. |
| 9,927,520 B1 | 3/2018 | Ward et al. |
| 9,952,595 B2 | 4/2018 | Arbuckle et al. |
| 2003/0191562 A1 | 10/2003 | Robertson et al. |
| 2004/0221787 A1 | 11/2004 | McKenney et al. |
| 2005/0164569 A1* | 7/2005 | Kaji ............... B63H 21/22 440/1 |
| 2005/0170713 A1 | 8/2005 | Okuyama |
| 2006/0089794 A1 | 4/2006 | Depasqua |
| 2006/0116796 A1 | 6/2006 | Fossen et al. |
| 2007/0017426 A1 | 1/2007 | Kaji et al. |
| 2007/0089660 A1 | 4/2007 | Bradley et al. |
| 2007/0162207 A1 | 7/2007 | Shimo et al. |
| 2007/0178779 A1 | 8/2007 | Takada et al. |
| 2007/0203623 A1 | 8/2007 | Saunders et al. |
| 2007/0233389 A1 | 10/2007 | Stephens |
| 2008/0027597 A1* | 1/2008 | Barrett ............ B63H 25/04 701/21 |
| 2009/0037040 A1 | 2/2009 | Salmon et al. |
| 2009/0171520 A1 | 7/2009 | Kaji |
| 2009/0276148 A1 | 11/2009 | Ardvisson |
| 2010/0023192 A1 | 1/2010 | Rae et al. |
| 2010/0070124 A1 | 3/2010 | Yeager et al. |
| 2010/0109944 A1 | 5/2010 | Whitehead et al. |
| 2011/0153126 A1* | 6/2011 | Arbuckle ......... B63H 25/42 701/21 |
| 2011/0288714 A1 | 11/2011 | Flohr et al. |
| 2012/0129410 A1 | 5/2012 | Tyers |
| 2012/0130570 A1 | 5/2012 | Pease |
| 2012/0248259 A1 | 10/2012 | Page et al. |
| 2013/0080044 A1 | 3/2013 | Tyers et al. |
| 2013/0297104 A1 | 11/2013 | Tyers et al. |
| 2014/0114509 A1 | 4/2014 | Venables et al. |
| 2014/0362661 A1 | 12/2014 | Muijzert et al. |
| 2015/0089427 A1 | 3/2015 | Akuzawa |
| 2015/0277442 A1 | 10/2015 | Ballou |
| 2015/0321740 A1 | 11/2015 | Bradley et al. |
| 2015/0346730 A1 | 12/2015 | Stephens et al. |
| 2016/0016651 A1 | 1/2016 | Anderson et al. |
| 2016/0039500 A1 | 2/2016 | Heyring et al. |
| 2016/0061980 A1 | 3/2016 | Tonchia et al. |
| 2016/0101838 A1 | 4/2016 | Kojima |
| 2016/0125739 A1 | 5/2016 | Stewart et al. |
| 2016/0246300 A1 | 8/2016 | Langford-Wood |
| 2016/0252907 A1 | 9/2016 | Parkinson |
| 2016/0299507 A1 | 10/2016 | Shah et al. |
| 2016/0334792 A1 | 11/2016 | Jopling |
| 2017/0205828 A1 | 7/2017 | Estabrook |
| 2017/0205829 A1 | 7/2017 | Tyers |
| 2017/0210449 A1 | 7/2017 | Frisbie et al. |
| 2017/0255200 A1 | 9/2017 | Arbuckle et al. |
| 2017/0277189 A1* | 9/2017 | Johnson ............ B63H 25/06 |
| 2017/0349257 A1 | 12/2017 | Hara et al. |
| 2017/0365175 A1 | 12/2017 | Harnett |
| 2018/0015994 A1 | 1/2018 | Kishimoto et al. |
| 2018/0106619 A1 | 4/2018 | Johnson et al. |
| 2018/0284815 A1 | 10/2018 | Cui et al. |

(56) References Cited

U.S. PATENT DOCUMENTS

2019/0286169 A1 9/2019 Cui et al.
2019/0359300 A1 11/2019 Johnson et al.

FOREIGN PATENT DOCUMENTS

| | | |
|---|---|---|
| EP | 2952994 | 12/2015 |
| GB | 1173442 | 12/1969 |
| JP | 58061097 | 4/1983 |
| JP | 05-203638 A | 8/1993 |
| JP | 7223591 | 8/1995 |
| JP | 2926533 B2 | 7/1997 |
| JP | 11-129978 A | 5/1999 |
| JP | 2001-287697 | 10/2001 |
| JP | 2002-178990 | 6/2002 |
| JP | 2002173091 A | 6/2002 |
| JP | 2003276677 A | 10/2003 |
| JP | 200442884 A | 2/2004 |
| JP | 2004355105 A | 12/2004 |
| JP | 2005-200004 | 7/2005 |
| JP | 2006-137309 | 6/2006 |
| JP | 2006137309 A | 6/2006 |
| JP | 2009-227035 | 10/2009 |
| JP | 2009-241738 | 10/2009 |
| JP | 2009-538782 A | 11/2009 |
| JP | 2011128943 | 6/2011 |
| JP | 5042906 B2 | 7/2012 |
| JP | 2012528417 A | 11/2012 |
| JP | 5226355 B2 | 7/2013 |
| JP | 2014065495 | 4/2014 |
| JP | 200546034 A | 2/2015 |
| WO | 9205505 A1 | 4/1992 |
| WO | 2006058400 | 6/2006 |
| WO | 2014033457 | 3/2014 |
| WO | 2016104031 | 6/2016 |
| WO | WO 2017095235 A1 | 6/2017 |

OTHER PUBLICATIONS

Arbuckle et al., "Station Keeping Methods," Unpublished U.S. Appl. No. 15/887,372, filed Feb. 2, 2018.
Gonring, "System and Method for Controlling Course of a Marine Vessel," Unpublished U.S. Appl. No. 15/415,095, filed Jan. 25, 2017.
Arbuckle et al., "Methods for Positioning Marine Vessels," Unpublished U.S. Appl. No. 16/028,019, filed Jul. 5, 2018.
Ward et al., "Method and System for Close Proximity Collision Detection", Unpublished U.S. Appl. No. 14/807,217, filed Jul. 23, 2015.
Poorman et al., "Multilayer Control System and Method for Controlling Movement of a Marine Vessel", Unpublished U.S. Appl. No. 11/965,583, filed Dec. 27, 2007.
Andrasko et al., "System and Method for Controlling Handling of a Marine Vessel", Unpublished U.S. Appl. No. 14/484,702, filed Sep. 12, 2014.

* cited by examiner

STATION KEEPING METHODS

CROSS-REFERENCE TO RELATED APPLICATION

The present application claims the benefit of U.S. Provisional Application Ser. No. 62/301,887, filed on Mar. 1, 2016, which is hereby incorporated by reference.

FIELD

The present disclosure relates to automatic positioning systems and methods for marine vessels.

BACKGROUND

U.S. Pat. No. 6,273,771, which is hereby incorporated by reference herein, discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,305,928, which is hereby incorporated by reference herein, discloses a vessel positioning system that maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

U.S. Pat. No. 8,478,464, which is hereby incorporated by reference herein, discloses systems and methods for orienting a marine vessel to enhance available thrust in a station keeping mode. A control device having a memory and a programmable circuit is programmed to control operation of a plurality of marine propulsion devices to maintain orientation of a marine vessel in a selected global position. The control device is programmed to calculate a direction of a resultant thrust vector associated with the plurality of marine propulsion devices that is necessary to maintain the vessel in the selected global position. The control device is programmed to control operation of the plurality of marine propulsion devices to change the actual heading of the marine vessel to align the actual heading with the thrust vector.

Other patents describing various station keeping features and related system and method improvements include: U.S. Pat. Nos. 7,267,068; 8,050,630; 8,417,399; 8,694,248; 8,807,059; 8,924,054; 9,132,903; 9,377,780; and unpublished U.S. patent application Ser. No. 14/484,702, filed Sep. 12, 2014; and Ser. No. 14/807,217, filed Jul. 23, 2015. Each of these patents and applications is hereby incorporated by reference herein.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One example of the present disclosure is of a method for maintaining a marine vessel in a selected position, the marine vessel being propelled by a marine propulsion device. The method includes determining a current global position of the marine vessel and, with a control module, receiving a signal command to maintain the current global position of the marine vessel. The method also includes storing the current global position of the marine vessel as a target global position in response to receiving the signal command. The method next includes determining a subsequent global position of the marine vessel and calculating a position error difference between the subsequent global position and the target global position. The method includes determining marine vessel movements that are required to minimize the position error difference, and, with the control module, causing the marine propulsion device to produce a thrust having a magnitude, a direction, and an angle calculated to result in achievement of the required marine vessel movements. The method also includes, with the control module, controlling at least one of a timing and a frequency of discontinuity of thrust production by the marine propulsion device while attempting to minimize the position error difference.

Another example of the present disclosure is of a method for maintaining a marine vessel in a selected position, the marine vessel being propelled by a marine propulsion device. The method comprises determining a current global position of the marine vessel; determining a current heading of the marine vessel; with a control module, receiving a signal command to maintain the current global position and the current heading of the marine vessel; and storing the current global position and the current heading of the marine vessel as a target global position and a target heading in response to receiving the signal command. The method also includes determining a subsequent global position of the marine vessel; determining a subsequent heading of the marine vessel; calculating a position error difference between the subsequent global position and the target global position; and calculating a heading error difference between the subsequent heading and the target heading. The method next includes determining marine vessel movements that are required to minimize the position error difference and the heading error difference, and, with the control module, causing the marine propulsion device to produce a thrust having a magnitude, a direction, and an angle calculated to result in achievement of the required marine vessel movements. The method also includes controlling, with the control module, at least one of a timing and a frequency of discontinuity of thrust production by the marine propulsion device while attempting to minimize the position error difference and the heading error difference.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

Figure 1:
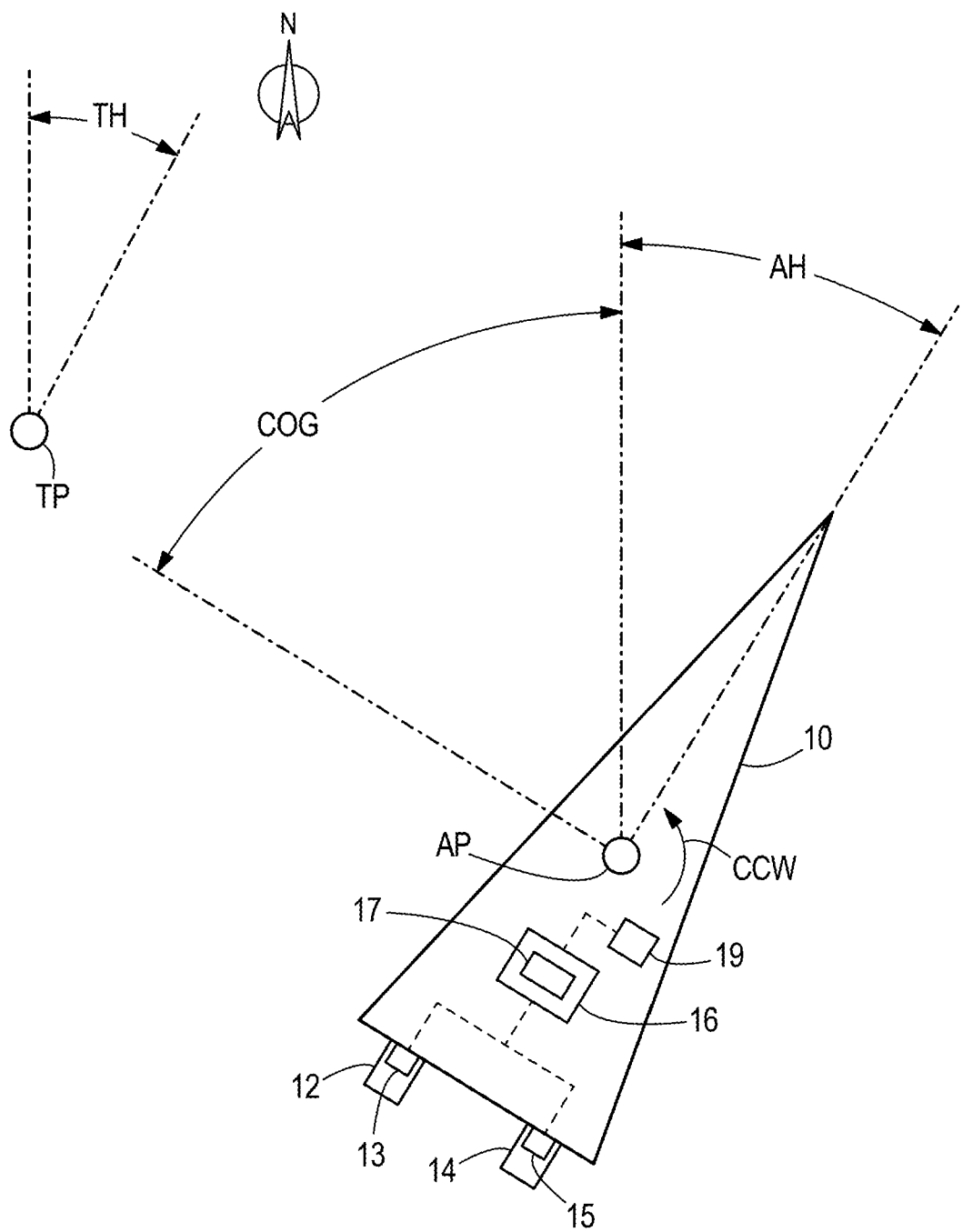
FIG. 1 is a schematic for purposes of illustrating a method for maintaining a marine vessel at a target global position and a target heading.

Referring to FIG. 1, in a station keeping mode, a marine vessel 10 can be maintained in a single global position (defined by latitude and longitude) and at a predetermined heading by way of an algorithm that controls the vessel's propulsion device(s) 12, 14 to counteract the effects of wind, waves, current, etc. that would tend to move the vessel 10 off this location and/or to a new heading. In essence, the propulsion devices 12, 14 are controlled to maintain the vessel 10 at a virtual anchor point. A control module 16 that controls thrust and angular orientation of the propulsion devices 12, 14 acts as a joystick and calculates left/right, fore/aft, and yaw commands required to drive the vessel's position error and heading error to zero. The control module 16 can control one or more propulsion devices 12, 14 to do so, which may be located at the rear of the vessel 10 such as with outboards, jet drives, or stern drives, under the vessel 10 such as with pod drives, or at the front of the vessel 10 such as with thrusters, which may also or alternatively be located at the rear or sides of the vessel 10. Each marine propulsion device 12, 14 is associated with a respective power transmission mechanism 13, 15. The power transmission mechanisms 13, 15 may each comprise a single shaft, gear, or clutch, or may comprise a series of shafts, gears, clutches, etc. that transmit power from a prime mover, such as an engine or a motor located in the propulsion device or aboard the vessel 10, to a rotating thrust-producing device, such as a propeller, impeller, propulsor, or the like. The power transmission mechanisms 13, 15 may be transmissions that are shiftable to forward, neutral, and reverse positions, or may be designed such that they are capable only of rotating or not rotating, for example if they are engaged or not engaged with the prime mover or if the prime mover itself is turned on or off.

An example of the inputs to the control module's calculations while the vessel 10 in station keeping mode is shown in FIG. 1. In this example, the actual global position (AP) of a preselected point on the vessel 10, as determined by a GPS receiver, is not equal to a setpoint target global position (TP), and thus the control module 16 will calculate a course over ground (COG) that the vessel 10 must travel to reach the target global position TP. Additionally, a setpoint target heading (TH) is 27 degrees from north, while the actual heading (AH) read from a compass or an inertial measurement unit (IMU) is 35.8 degrees. The control module 16 will therefore determine that a counterclockwise yaw movement (arrow CCW) of 8.8 degrees is required to return the vessel 10 to the target heading TH.

The control module 16 determines when and how much corrective action to take according to a three-dimensional (left/right, fore/aft, and yaw) proportional, integral, and derivative (PID) control algorithm performed by a feedback controller 17 of the control module 16. The integral term allows the control system to reject constant and slowly varying disturbances (e.g., current) while maintaining near zero position error. The proportional and derivative terms handle the quickly varying disturbances. The integral term is also considered to have memory and can take time to increase or decrease, especially if the disturbance forces grow. The PID feedback controller 17 computes a desired force in the forward/back and left/right directions with reference to the marine vessel 10, along with a desired yaw moment relative to the marine vessel 10, in order to null the error elements. The computed force and moment elements are then transmitted to the vessel maneuvering system, which delivers the requested forces and moments by positioning the independently steerable propulsion devices 12, 14, controlling the power provided to the propellers, impellers, or propulsors of each device, and controlling the thrust vector directions of both devices. Such automatic correction of the position and heading of the marine vessel 10 can be achieved according to the principles described in U.S. Pat. No. 7,305,928, which was incorporated by reference herein above.

The present disclosure contemplates a number of ways in which the above-described station keeping functionality can be expanded upon. In one example, the station keeping algorithm is modified to prevent or at least reduce the likelihood of overshoot of the target global position TP and/or target heading TH when making a correction. A need for this type of modification arose with the advent of the application of station keeping methods to vessels equipped with stern drives or outboard motors. When station keeping is implemented on vessel propelled by a pod drive, a trolling valve can be used to allow slip between the engine and the propeller of the pod drive. Such slip allows for very small increments of thrust, thereby enabling the vessel 10 to be moved by very small distances upon engagement of the transmission. However, stern drives are not generally equipped with trolling valves, and thus the thrust increment from neutral to in-gear is larger. With an outboard, the thrust increment is even more pronounced, especially if the outboard has dual propellers or a high pitch propeller. For instance, if a vessel propelled by outboard motors is put into gear for even one second, the vessel may travel fifteen feet before naturally coming to rest. Thus, if the vessel was fewer than fifteen feet from the target global position, putting the propulsion devices in gear would result in overshooting the target.

Note that the control module 16 can cause a discontinuity in thrust production by the marine propulsion devices 12, 14 by turning the prime mover(s) on or off, shifting the propulsion devices' transmissions to different positions, or otherwise engaging or disengaging the shafts holding the propellers, impellers, or propulsors from the prime mover(s). In order to address the above-mentioned overshoot, the present inventors have developed an algorithm that utilizes an input-output map such as a look up table, chart, or similar, that dictates when to create a discontinuity in thrust production, such as when to engage or disengage the propulsion device's propeller, impeller, or propulsor. In one example, the control module 16 creates a discontinuity in thrust production by disengaging the propulsion devices' propellers, after which the vessel 10 will be allowed to coast to the target orientation. The determination regarding when to discontinue thrust production can be made based on position error (target global position minus actual global position), position error velocity, and/or vessel velocity. This allows the length of time that the propeller, impeller, or propulsor is rotating to be scaled down based on how far the vessel 10 is from the setpoint and/or velocity.

Figure 2:
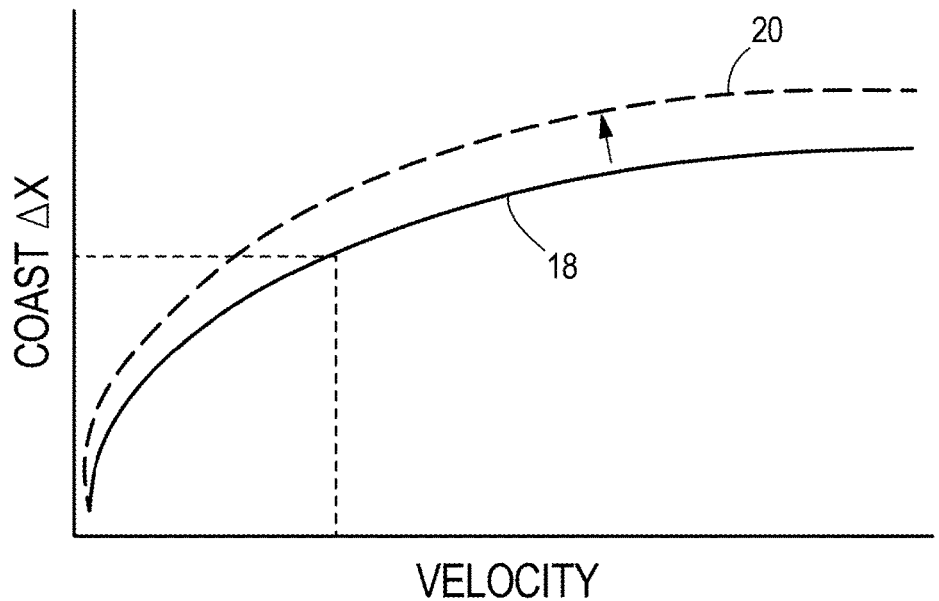
FIG. 2 illustrates an input-output map for use with a station keeping method of the present disclosure.

For example, FIG. 2 shows a chart of vessel velocity on the horizontal axis versus a value called "CoastΔX" on the vertical axis. As vessel velocity increases, the distance away from the target ("CoastΔX") at which the control module 16 will command the propulsion devices 12, 14 to discontinue thrust production increases, as shown by the curve 18. This is because the greater the velocity, the longer it will take for the vessel 10 to coast to a stop due to momentum. The look-up table or map can be made adaptable, and may learn the specific characteristics of a particular vessel as it glides through the water. The CoastΔX curve 18 could be modified or adapted such that after each iteration of the algorithm described herein, it more accurately predicts how far the vessel 10 will move after the propulsion devices 12, 14 are no longer producing thrust, such as for example after they are shifted out of forward gear. For example, if the vessel 10 continually overshoots the target global position while coasting, the input-output map may re-define the relationship between velocity and CoastΔX as that shown by the adapted curve 20. Note that if position error or position error velocity is instead used as the input variable, those values would be on the horizontal axis of the table. A similar input-output table can be used for yaw control as for position control, but with the vertical axis being measured in angular units and the horizontal axis being measured in angular velocity, angular position error, or angular position error velocity.

Figure 3:
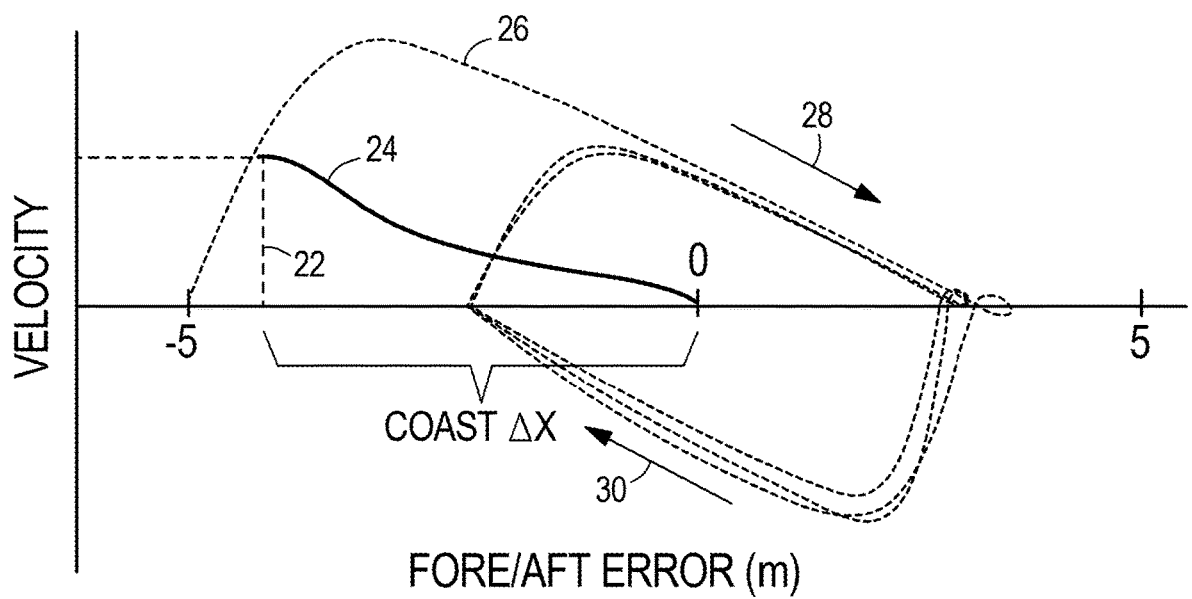
FIG. 3 is a chart showing fore/aft position error of a marine vessel with respect to its velocity.

Referring to FIG. 3, consider the following example: the vessel 10 is moving at a velocity of four mph toward the target global position TP. The measured velocity is used to determine the CoastΔX from the curve 18 (see FIG. 2). Once the actual measured distance from the target global position TP is equal to the CoastΔX, the control module 16 will reduce the throttles and shift the transmissions to neutral. This happens well before reaching the target global position (here, as shown at location 22, just under five meters from the target global position) such that the vessel's velocity will naturally decrease as shown by curve 24, and the vessel 10 will arrive exactly at the target global position (zero meters of fore/aft error) without overshoot. The CoastΔX acts therefore as a feed forward term that is applied prior to control by the PID control algorithm, such that the PID algorithm does not instruct further correction after the position error difference reaches the CoastΔX value, which would cause overshoot. This is in comparison to current methods, in which the vessel overshoots the target position and then attempts to correct itself by reversing due to PID-only control, which may result in constant overshoot of the target global position in both the forward and reverse directions, as shown by the curve 26 and the arrows 28 and 30.

This method can be very useful when the vessel 10 is operating in calm, no wind conditions. In contrast, because wind and waves apply a stopping force, in high wind or strong wave conditions, the elemental forces may be enough to balance the in-gear thrust supplied by the propulsion devices 12, 14.

In another example, the life of the power transmission mechanisms 13, 15 of the propulsion device(s) 12, 14 can be increased and NVH can be optimized by implementing an adaptive gain in the PID control. Currently, station keeping systems have a user input device that allows a user to control the "response" of the station keeping controller, i.e., how aggressively it will maintain a given heading and global position. The adaptive gain strategy of the second embodiment of the present disclosure is instead based on limiting the number of discontinuities of thrust production, such as transmission shifts or thrust on/off cycles, per given unit of time. For instance, the response (control gain) of the system can be adjusted to keep the number of discontinuities per minute around a specified number. This would allow the system to maintain good position control under heavy sea conditions (where shifting is less likely) and would be able to provide low NVH under calm sea conditions. Additionally, the system would be prevented from overshooting the target and reversing repeatedly while attempting to achieve the target.

Returning to FIG. 1, the control module 16 is programmable and includes a processing system and a storage system. The control module 16 can be located anywhere on the vessel 10 and/or located remote from the vessel 10 and can communicate with various components of the vessel 10 via a peripheral interface and wired and/or wireless links, as will be explained further herein below. Although FIG. 1 shows one control module 16, the vessel 10 can include more than one control module. Portions of the method disclosed herein below can be carried out by a single control module or by several separate control modules. For example, the system can have a control module located at or near a helm of the vessel 10 and can also have control module(s) located at or near the propulsion devices 12, 14. If more than one control module is provided, each can control operation of a specific device or sub-system on the vessel 10.

In some examples, the control module 16 may include a computing system that includes a processing system, storage system, software, and input/output (I/O) interface for communicating with peripheral devices. The systems may be implemented in hardware and/or software that carries out a programmed set of instructions. For example, the processing system loads and executes software from the storage system, such as software programmed with a station keeping method, which directs the processing system to operate as described herein below in further detail. The computing system may include one or more processors, which may be communicatively connected. The processing system can comprise a microprocessor, including a control unit and a processing unit, and other circuitry, such as semiconductor hardware logic, that retrieves and executes software from the storage system. The processing system can be implemented within a single processing device but can also be distributed across multiple processing devices or sub-systems that cooperate according to existing program instructions. The processing system can include one or many software modules comprising sets of computer executable instructions for carrying out various functions as described herein.

As used herein, the term "control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A control module may include memory (shared, dedicated, or group) that stores code executed by the processing system. The term "code" may include software, firmware, and/or microcode, and may refer to programs, routines, functions, classes, and/or objects. The term "shared" means that some or all code from multiple modules may be executed using a single (shared) processor. In addition, some or all code from multiple control modules may be stored by a single (shared) memory. The term "group" means that some or all code from a single control module may be executed using a group of processors. In addition, some or all code from a single control module may be stored using a group of memories.

The storage system can comprise any storage media readable by the processing system and capable of storing software. The storage system can include volatile and non-volatile, removable and non-removable media implemented in any method or technology for storage of information, such as computer-readable instructions, data structures, software modules, or other data. The storage system can be implemented as a single storage device or across multiple storage devices or sub-systems. The storage system can include additional elements, such as a memory controller capable of communicating with the processing system. Non-limiting examples of storage media include random access memory, read-only memory, magnetic discs, optical discs, flash memory, virtual and non-virtual memory, various types of magnetic storage devices, or any other medium which can be used to store the desired information and that may be accessed by an instruction execution system. The storage media can be a transitory storage media or a non-transitory storage media such as a non-transitory tangible computer readable medium.

The control module 16 communicates with one or more components on the vessel 10 via the I/O interface and a communication link, which can be a wired or wireless link. In one example, the communication link is a controller area network (CAN) bus, but other types of links could be used.

The provided description of the control module 16 is conceptual and should be interpreted generally, as those skilled in the art will recognize many ways to implement such a control module. These include implementation using a digital microprocessor that receives input signals and performs a calculation using the input signals to produce the corresponding output signals or actuator control signals. Also, analog computers may be used, which comprise circuit elements arranged to produce the desired outputs. Furthermore, look-up tables containing predetermined or calibrated data points may be stored in any fashion to provide the desired output corresponding to a given input signal.

Figure 4:
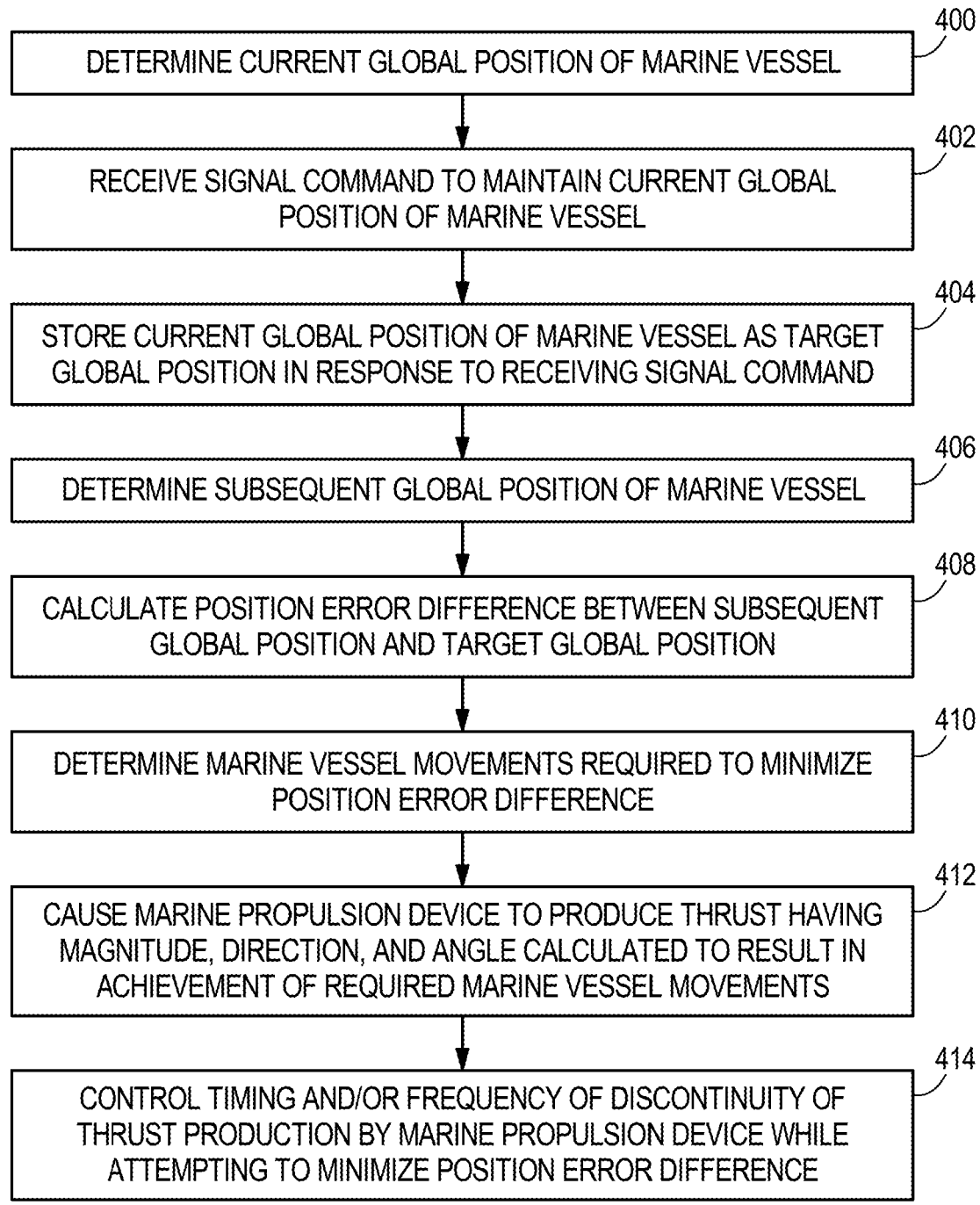
FIG. 4 illustrates one example of a station keeping method according to the present disclosure.

Turning to FIG. 4, a method for maintaining a marine vessel 10 in a selected position, the marine vessel 10 being propelled by a marine propulsion device 12 and/or 14, will be described. As shown at 400, the method includes determining a current global position of the marine vessel 10. This may be done using a GPS receiver in communication with the control module 16. As shown at 402, the method includes receiving, with the control module 16, a signal command to maintain the current global position of the marine vessel 10. This can be done, for example, by selecting a station keeping mode of the system by way of a button, touch screen, or similar input device 19 (FIG. 1), or by manipulating other user input devices in a particular programmed sequence. As shown at 404, the method includes storing the current global position of the marine vessel 10 as a target global position TP in response to receiving the signal command. The current global position can be stored as the target global position TP in a memory of the control module 16 or located elsewhere. As shown at 406, the method next includes determining a subsequent global position of the marine vessel 10. This may be the actual position AP of the vessel 10 as determined by the GPS receiver after the vessel 10 has drifted from the previously current target global position TP due to wind, waves, current, etc. As shown at 408, the method also includes calculating a position error difference between the subsequent global position AP and the target global position TP. For instance, an error calculator section of the control module 16 may resolve these values into forward-reverse, left-right, and heading changes in reference to clockwise and counterclockwise movement of the marine vessel 10.

As shown at 410, the method includes determining marine vessel movements that are required to minimize the position error difference. These movements can be expressed both by a distance and a direction (i.e., a COG) the vessel 10 must travel to reach the target global position TP. In one example, the control module 16 determines the required marine vessel movements with the feedback controller 17. The method then includes, as shown at 412, with the control module 16, causing the marine propulsion device 12 and/or 14 to produce a thrust having a magnitude, a direction, and an angle calculated to result in achievement of the required marine vessel movements. This can be done using a maneuvering algorithm such as that described in U.S. Pat. No. 7,305,928, which was incorporated by reference herein above. In one example, the method may include causing the marine propulsion device 12, 14 to produce the calculated thrust only if the position error difference exceeds a predetermined position error threshold difference. This will ensure that correction is not made if the position error is so low that any quantum of thrust at all will cause the vessel 10 to overshoot the target global position TP. For example, the predetermined position error threshold could be equal to the distance the vessel 10 would coast if the transmissions of the marine propulsion devices 12, 14 were placed in gear with a minimum quantum of thrust and then immediately placed out of gear, or if the propeller, impeller, or propulsor were otherwise rotated by a minimum quantum of power and then stopped. Such a threshold may be helpful given that GPS devices have accuracy that can respond to even one-third of a meter of position error difference. Additionally, according to the present disclosure, as shown at 414, the method includes controlling, with the control module 16, at least one of a timing and a frequency of discontinuity of thrust production by the marine propulsion device 12 and/or 14 while attempting to minimize the position error difference.

As described herein above with respect to FIGS. 2 and 3, in response to the marine vessel 10 reaching a specified threshold distance (CoastΔX) from the target global position TP while the marine propulsion device 12, 14 is producing the calculated thrust, the method further comprises discontinuing producing thrust such that the marine vessel 10 thereafter coasts toward the target global position TP. In one example, the method comprises shifting the transmissions of the propulsion devices 12, 14 into neutral. The method may also include prohibiting the propulsion devices 12, 14 from producing thrust once the marine vessel 10 is within the specified distance CoastΔX of the target global position TP. For example, the method may comprise preventing the transmissions from shifting out of neutral. The method may include determining the specified distance CoastΔX based on one or more of the following: the position error difference, a rate of change of the position error difference, or a velocity of the marine vessel (see FIG. 2). If more than one of these variables is used, cascaded input-output maps or look-up tables with more than one input or more than one curve from which to select may be used. Also as noted herein above, in response to the marine vessel 10 overshooting the target global position TP while coasting, the method further comprises adapting the specified distance CoastΔX for retrieval during a future iteration of the method. See adapted curve 20 in FIG. 2. By the same principle, if the vessel continually undershoots the target, the curve can be adapted such that each velocity corresponds to a lesser value of CoastΔX.

Also as described herein above, the method may further comprise limiting the frequency of discontinuity of thrust production to a target number of discontinuities per unit time while the marine propulsion device 12, 14 is producing the calculated thrust. For example, the control module 16 may limit the number of discontinuities to somewhere in the range of twenty to thirty discontinuities per minute. In one example, in which the power transmission mechanisms 13, 15 include F-N-R transmissions, the method comprises limiting the frequency of shifting of the transmissions to a target number of shifts per unit time, and in response to the transmissions shifting by greater than the target number of shifts per unit time, the method further comprises prohibiting the transmissions from shifting for a remainder of the time unit (e.g. for the remainder of the minute). In another example, the method further comprises adapting a gain of the feedback controller 17 based on a difference between the target number of discontinuities (e.g., shifts) per unit time and a measured number of discontinuities (e.g., shifts) per unit time. In the example in which the number of discontinuities is a number of shifts of a transmission, the measured number of shifts can be detected by a gear position sensor in communication with the control module 16. Other measured discontinuities can be on/off cycles of the prime mover or changes between rotating and non-rotating states of the propellers, impellers, or propulsors.

Figure 5:
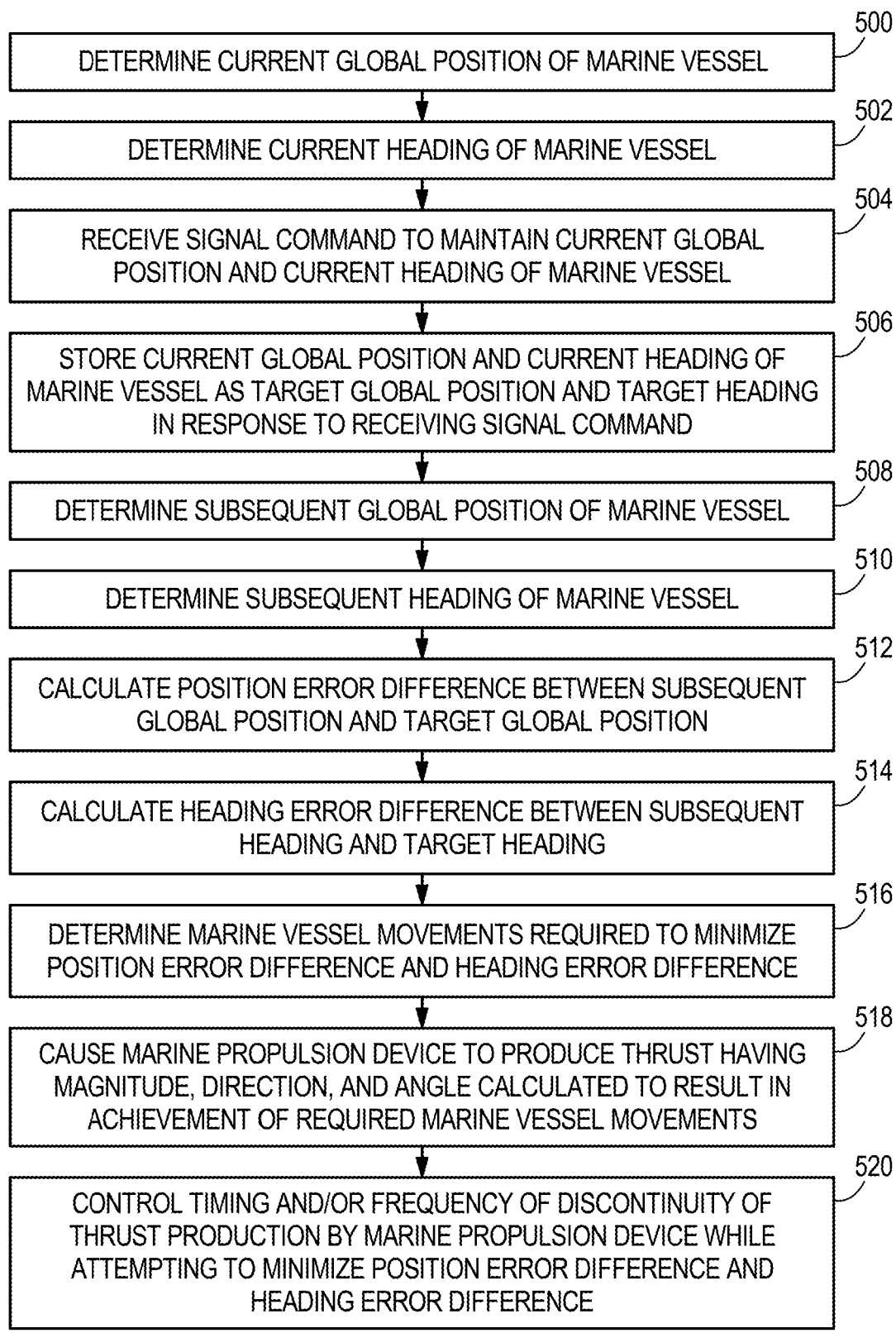
FIG. 5 illustrates another example of a station keeping method according to the present disclosure.

With reference to FIG. 5, another example of a method for maintaining a marine vessel 10 in a selected position, the marine vessel 10 being propelled by a marine propulsion device 12 and/or 14, will be described. As shown at 500, the method includes determining a current global position of the marine vessel 10, such as by using a GPS receiver. As shown at 502, the method includes determining a current heading of the marine vessel 10, such as by using a compass or an IMU. As shown at 504, the method includes receiving, with a control module 16, a signal command to maintain the current global position and the current heading of the marine vessel 10, such as from an input device 19. As shown at 506, the method includes storing the current global position and the current heading of the marine vessel 10 as a target global position TP and a target heading TH in response to receiving the signal command. As shown at 508, the method includes determining a subsequent global position AP of the marine vessel 10. The method also includes determining a subsequent heading AH of the marine vessel 10, as shown at 510. As shown at 512, the method includes calculating a position error difference between the subsequent global position AP and the target global position TP. As shown at 514, the method includes calculating a heading error difference between the subsequent heading AH and the target heading TH.

The method also includes, as shown at 516, determining marine vessel movements that are required to minimize the position error difference and the heading error difference. As shown at 518, the method includes, with the control module 16, causing the marine propulsion device 12 and/or 14 to produce a thrust having a magnitude, a direction, and an angle calculated to result in achievement of the required marine vessel movements. Not only may the method include causing the marine propulsion device 12, 14 to produce the calculated thrust only if the position error difference exceeds a predetermined position error threshold difference, the method may also include causing the marine propulsion device 12, 14 to produce the calculated thrust only if the heading error difference exceeds a predetermined heading error threshold difference.

As shown at 520, the method includes controlling, with the control module 16, at least one of a timing and a frequency of discontinuity of thrust production by one or both of the marine propulsion devices 12, 14 while attempting to minimize the position error difference and the heading error difference. For example, in response to the marine vessel 10 reaching a specified threshold angle from the target heading TH while the marine propulsion devices 12, 14 are producing the calculated thrust, the method further comprises discontinuing thrust production, such as by shifting one or both of the transmissions into neutral, such that momentum thereafter rotates the marine vessel 10 toward the target heading TH. The method may also include determining the specified threshold angle based on one or more of the following: the heading error difference, a rate of change of the heading error difference, and an angular velocity of the marine vessel 10. The method may also include, in response to the marine vessel 10 reaching a specified threshold distance from the target global position TP while the marine propulsion devices 12, 14 are producing the calculated thrust, discontinuing thrust production by one or both of the marine propulsion devices 12, 14 such that the marine vessel 10 thereafter coasts toward the target global position TP. If two marine propulsion devices are provided, the method may include using one of the marine propulsion devices 12 or 14 to continue to provide forward, reverse, or side-to-side movement even after the propulsion device that has been causing the vessel 10 to yaw is shifted into neutral. Similarly, the control module 16 may choose to continue to provide thrust to rotate the vessel 10 using one of the propulsion devices 12 or 14 even after the other propulsion device, which had been causing the vessel 10 to move fore/aft or left/right, is placed in neutral. In still other examples, the control module 16 may cause both propulsion devices 12, 14 to change their magnitude, direction, and/or angle of thrust so as to cease providing translation or rotation, while still providing the other of rotation or translation, depending on which threshold was met and which was not.

Note that in each of the above examples, one or both of the propulsion devices 12, 14 and their respective power transmission mechanisms 13, 15 can be controlled. The propulsion devices 12, 14 and their respective power transmission mechanisms 13, 15 can also be controlled independently of one another, such that their magnitudes, directions, and/or angles of thrust are different from one another. Note also that only one propulsion device 12 or 14 need be provided on the vessel 10. Although the present disclosure describes the benefits of using the present methods with outboard motors or stern drives, the methods could be used with other types of propulsion devices as well.

In the above description, certain terms have been used for brevity, clarity, and understanding. No unnecessary limitations are to be inferred therefrom beyond the requirement of the prior art because such terms are used for descriptive purposes and are intended to be broadly construed. The different methods described herein may be used alone or in combination with other systems or methods. It is to be expected that various equivalents, alternatives and modifications are possible within the scope of the present claims.

The invention claimed is:

1. A method for maintaining a marine vessel in a selected position, the marine vessel being propelled by a marine propulsion device, the method comprising:
   determining a current global position of the marine vessel;
   with a control module, receiving a signal command to maintain the current global position of the marine vessel;
   storing the current global position of the marine vessel as a target global position in response to receiving the signal command;
   determining a subsequent global position of the marine vessel;
   calculating a position error difference between the subsequent global position and the target global position;
   determining marine vessel movements that are required to minimize the position error difference;
   with the control module, causing the marine propulsion device to produce a thrust having a magnitude, a direction, and an angle calculated to result in achievement of the required marine vessel movements; and
   with the control module, controlling at least one of a timing and a frequency of discontinuity of thrust production by the marine propulsion device while attempting to minimize the position error difference;
   wherein controlling the frequency of discontinuity of thrust production comprises limiting the frequency of discontinuity of thrust production to a specified target number of discontinuities per unit time while the marine propulsion device is producing the calculated thrust; and
   wherein controlling the timing of discontinuity of thrust production comprises, in response to the marine vessel reaching a specified threshold distance from the target global position while the marine propulsion device is producing the calculated thrust, discontinuing thrust production such that the marine vessel thereafter coasts toward the target global position.

2. The method of claim 1, wherein in response to a transmission of the marine propulsion device shifting by greater than the specified target number of discontinuities per unit time, the method further comprises prohibiting the transmission from shifting for a remainder of the time unit.

3. The method of claim 1, further comprising determining the required marine vessel movements with a feedback controller and adapting a gain of the feedback controller based on a difference between the specified target number of discontinuities per unit time and a measured number of discontinuities per unit time.

4. The method of claim 1, further comprising prohibiting the marine propulsion device from producing thrust once the marine vessel is within the specified threshold distance of the target global position.

5. The method of claim 1, further comprising determining the specified threshold distance based on one or more of the following: the position error difference, a rate of change of the position error difference, and a velocity of the marine vessel.

6. The method of claim 1, wherein in response to the marine vessel overshooting the target global position while coasting, the method further comprises adapting the specified threshold distance for retrieval during a future iteration of the method.

7. The method of claim 1, further comprising causing the marine propulsion device to produce the calculated thrust only if the position error difference exceeds a predetermined position error threshold difference.

8. The method of claim 1, further comprising:
   determining a current heading of the marine vessel;
   storing the current heading of the marine vessel as a target heading in response to receiving the signal command;
   determining a subsequent heading of the marine vessel;
   with the control module, calculating a heading error difference between the subsequent heading and the target heading;
   with the control module, determining marine vessel movements that are required to minimize the position error difference and the heading error difference;
   with the control module, causing the marine propulsion device to produce a thrust having a magnitude, a direction, and an angle calculated to result in achievement of the marine vessel movements that are required to minimize the position error difference and the heading error difference; and
   with the control module, controlling at least one of the timing and the frequency of discontinuity of thrust production by the marine propulsion device while attempting to minimize the position error difference and the heading error difference.

9. A method for maintaining a marine vessel in a selected position, the marine vessel being propelled by a marine propulsion device, the method comprising:
   determining a current global position of the marine vessel;
   determining a current heading of the marine vessel;
   with a control module, receiving a signal command to maintain the current global position and the current heading of the marine vessel;
   storing the current global position and the current heading of the marine vessel as a target global position and a target heading, respectively, in response to receiving the signal command;
   determining a subsequent global position of the marine vessel;
   determining a subsequent heading of the marine vessel;
   calculating a position error difference between the subsequent global position and the target global position;
   calculating a heading error difference between the subsequent heading and the target heading;
   determining marine vessel movements that are required to minimize the position error difference and the heading error difference;
   with the control module, causing the marine propulsion device to produce a thrust having a magnitude, a direction, and an angle calculated to result in achievement of the required marine vessel movements; and
   with the control module, controlling at least one of a timing and a frequency of discontinuity of thrust production by the marine propulsion device while attempting to minimize the position error difference and the heading error difference;
   wherein controlling the frequency of discontinuity of thrust production comprises limiting the frequency of discontinuity of thrust production to a specified target number of discontinuities per unit time while the marine propulsion device is producing the calculated thrust; and
   wherein controlling the timing of discontinuity of thrust production comprises, in response to the marine vessel reaching a specified threshold distance from the target global position while the marine propulsion device is producing the calculated thrust, discontinuing thrust production such that the marine vessel thereafter coasts toward the target global position.

10. The method of claim 9, wherein in response to a transmission of the marine propulsion device shifting by greater than the specified target number of discontinuities per unit time, the method further comprises prohibiting the transmission from shifting for a remainder of the time unit.

11. The method of claim 9, further comprising determining the required marine vessel movements with a feedback controller and adapting a gain of the feedback controller based on a difference between the specified target number of discontinuities per unit time and a measured number of discontinuities per unit time.

12. The method of claim 9, further comprising determining the specified threshold distance based on one or more of the following: the position error difference, a rate of change of the position error difference, and a velocity of the marine vessel.

13. The method of claim 12, wherein in response to the marine vessel overshooting the target global position while coasting, the method further comprises adapting the specified threshold distance for retrieval during a future iteration of the method.

14. The method of claim 9, wherein in response to the marine vessel reaching a specified threshold angle from the target heading while the marine propulsion device is producing the calculated thrust, the method further comprises discontinuing thrust production such that momentum thereafter rotates the marine vessel toward the target heading; and wherein the method further comprises determining the specified threshold angle based on one or more of the following: the heading error difference, a rate of change of the heading error difference, and an angular velocity of the marine vessel.

15. The method of claim 9, further comprising causing the marine propulsion device to produce the calculated thrust only if the position error difference exceeds a predetermined position error threshold difference.

16. The method of claim 15, further comprising causing the marine propulsion device to produce the calculated thrust only if the heading error difference exceeds a predetermined heading error threshold difference.

* * * * *